(12) United States Patent
Morishige et al.

(10) Patent No.: US 7,542,423 B1
(45) Date of Patent: Jun. 2, 2009

(54) HARDWARE LOAD BALANCING THROUGH A SINGLE FABRIC

(75) Inventors: Kevin D. Morishige, Los Altos, CA (US); Hans F. Lundberg, Sundbyberg (SE)

(73) Assignee: Cisco Technology, Inc., San Jose, CA (US)

( * ) Notice: Subject to any disclaimer, the term of this patent is extended or adjusted under 35 U.S.C. 154(b) by 122 days.

(21) Appl. No.: 11/711,290

(22) Filed: Feb. 27, 2007

Related U.S. Application Data (63) Continuation of application No. 09/811,189, filed on Mar. 16, 2001, now Pat. No. 7,184,403.

(51) Int. Cl.
*H04L 12/56* (2006.01)

(52) U.S. Cl. .................. 370/235; 370/360; 370/396; 370/398; 370/400

(58) Field of Classification Search ............ None
See application file for complete search history.

(56) References Cited

U.S. PATENT DOCUMENTS

| | | | |
|---|---|---|---|
| 4,383,316 A | 5/1983 | Seidel | 370/536 |
| 4,679,189 A | 7/1987 | Olson et al. | 370/396 |
| 5,159,591 A | 10/1992 | Gohara et al. | 370/396 |
| 5,377,182 A | 12/1994 | Monacos | 370/219 |
| 5,566,170 A | 10/1996 | Bakke et al. | 370/60 |
| 5,828,654 A | 10/1998 | Takase et al. | 370/233 |
| 5,838,677 A | 11/1998 | Kozaki et al. | 370/389 |
| 6,178,171 B1 | 1/2001 | Alexander et al. | 370/395.54 |
| 6,256,306 B1* | 7/2001 | Bellenger | 370/389 |
| 6,487,171 B1* | 11/2002 | Honig et al. | 370/235 |
| 6,628,655 B1* | 9/2003 | Fieschi et al. | 370/389 |
| 6,704,318 B1 | 3/2004 | Stuart et al. | 370/403 |
| 6,751,238 B1 | 6/2004 | Lipp et al. | 370/541 |
| 7,103,039 B1 | 9/2006 | Rose | 370/386 |

* cited by examiner

*Primary Examiner*—Chi H. Pham
*Assistant Examiner*—Shick Hom
(74) *Attorney, Agent, or Firm*—Campbell Stephenson LLP

(57) ABSTRACT

The present invention relates to a method and apparatus for balancing loads in a switching fabric. The switching fabric comprises a plurality of data ports through which data frames enter or exit the switching fabric. In one embodiment, the apparatus includes a buffer and a routing data generation circuit. The buffer receives a data frame to be transmitted to a destination device via the switching fabric. The routing data generation circuit is coupled to the buffer. The routing data generation circuit generates and adds routing data to the data frame received by the buffer. The routing data identifies one of the plurality of data ports through which the data frame will exit the switching fabric to reach the destination device. After the routing data is added to the data frame, the buffer transmits the data frame to the switching system.

19 Claims, 5 Drawing Sheets

HARDWARE LOAD BALANCING THROUGH A SINGLE FABRIC

CROSS-REFERENCE TO RELATED APPLICATIONS

The present patent application is a continuation of U.S. patent application Ser. No. 09/811,189, filed on Mar. 16, 2001 now U.S. Pat. No. 7,184,403, entitled "HARDWARE LOAD BALANCING THROUGH A SINGLE FABRIC" and is incorporated by reference herein in its entirety and for all purposes.

BACKGROUND OF THE INVENTION

Figure 1:
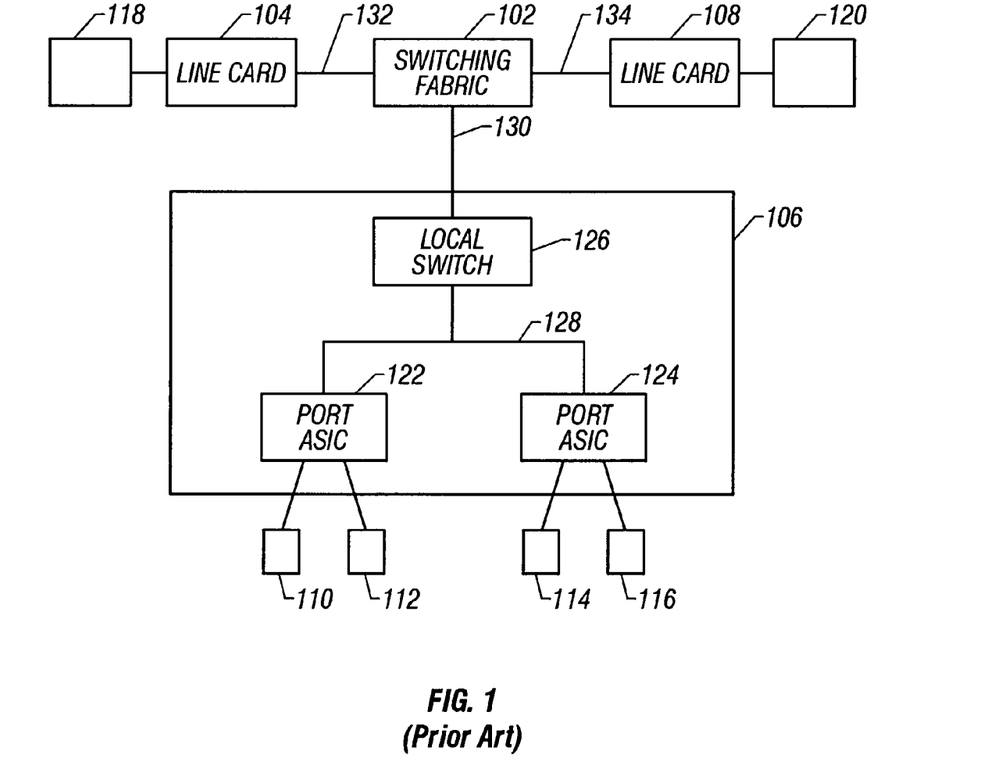
FIG. 1 is a block diagram illustrating a first local switching network.

Local switching networks (e.g., a switching network contained within an office building) may include a switching fabric connecting end devices via line cards. The term end devices is defined in this specification to include desktop computers, printers, routers or other networking equipment etc. FIG. 1 illustrates, in block diagram form, an exemplary local switching network 100. Local switch network 100 includes a switching fabric 102 (e.g., a cross bar switching fabric) coupled to line cards 104-108. Each of the line cards may include one or more ports which, in turn, may be coupled to end devices or other networks. FIG. 1 shows line card 106 coupled to four end devices 110-116, line card 104 coupled to end device 118, and line card 108 coupled to end device 120.

Line card 106 shown in FIG. 1 includes a pair of end device ports embodied in port application specific integrated circuits (ASICs) 122 and 124. The port ASICs 122 and 124 are coupled to end devices 110-116 and to switching fabric 102 via interface and local switch 126. Port ASICs 122 and 124 are coupled to interface and local switch 126 via a shared bus 128. Moreover, interface and local switch 126 is coupled to switching fabric 102 via data link 130. Line cards 104 and 108 are likewise coupled to switching fabric 102 via data link 132 and 134, respectively.

The local switching network 100 shown in FIG. 1 may employ one of many different communication protocols enabling data communication between one or more end devices 110-120 via line cards 106 through 108 and switching fabric 102. FIG. 1 will be described with reference to a communications protocol in which end devices communicate by transferring variable sized data frames with headers including source and destination information. Communication between end devices 110-120 can occur via a stream of such variable frames transmitted therebetween.

Figure 2:
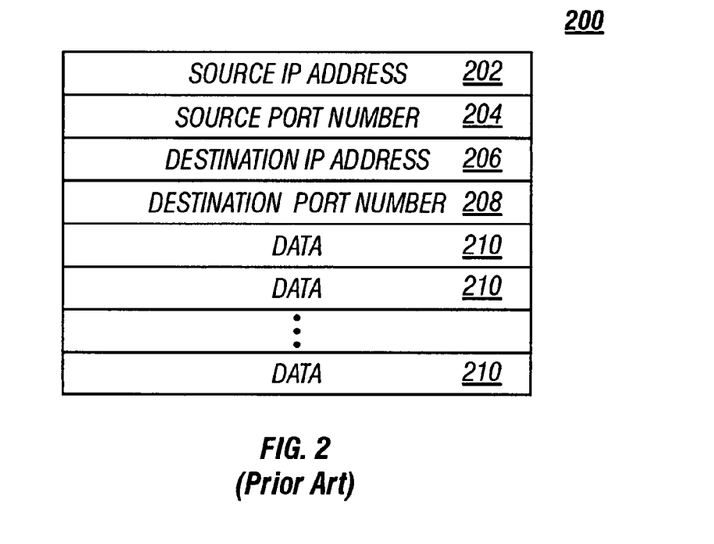
FIG. 2 is a block diagram illustrating a an exemplary data frame transmittable through the first local switching network of FIG. 1.

FIG. 2 illustrates an exemplary frame 200 used in the network 100 shown in FIG. 1. More particularly, frame 200 includes a header which further includes: field 202 containing a source IP address of one of the end devices 110-120; field 204 which contains a port number associated with the source IP address; field 206 which contains a destination IP address of an end device to receive frame 200, and; field 208 which contains a port number associated with the destination IP address in field 206. Frame 200 may further include one or more fields 210 for the data payload.

SUMMARY OF THE INVENTION

The present invention relates to a method and apparatus for balancing loads in a switching fabric. The switching fabric comprises a plurality of data ports through which data frames enter or exit the switching fabric. In one embodiment, the apparatus includes a buffer and a routing data generation circuit. The buffer receives a data frame to be transmitted to a destination device via the switching fabric. The routing data generation circuit is coupled to the buffer. The routing data generation circuit generates and adds routing data to the data frame received by the buffer. The routing data identifies one of the plurality of data ports through which the data frame will exit the switching fabric to reach the destination device. After the routing data is added to the data frame, the buffer transmits the data frame to the switching system.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

DETAILED DESCRIPTION

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

Figure 3:
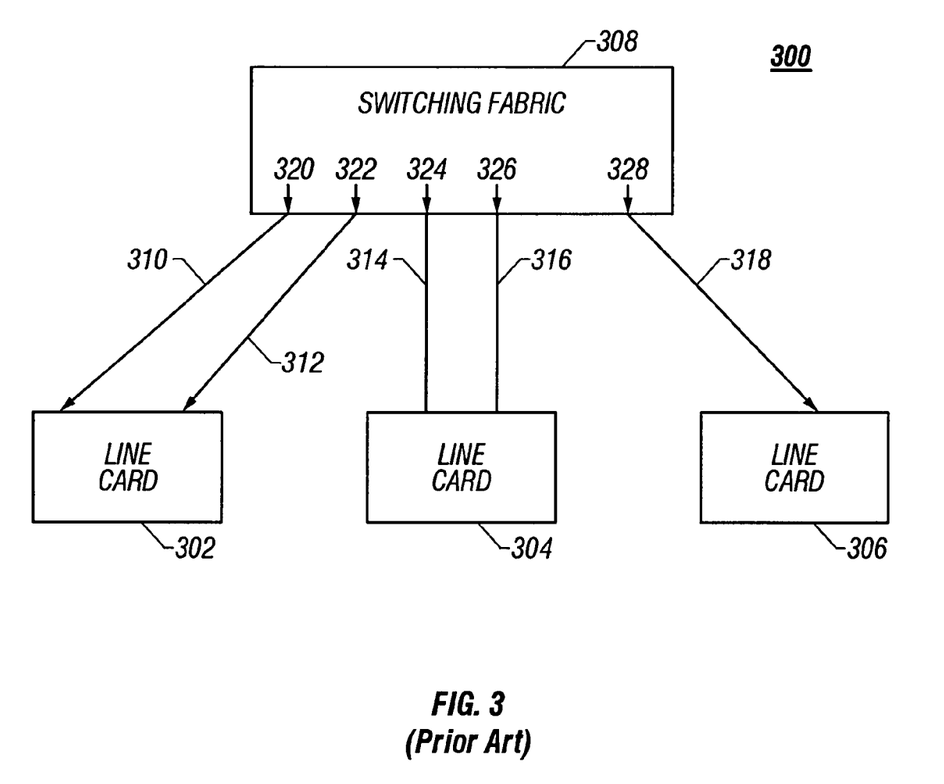
FIG. 3 is a block diagram illustrating a second local switching network.

The local switching network 100 of FIG. 1 shows a single data link between each line card 104-106 and switching fabric 102. Additional data links may be added between a line card and switching fabric 102. For example, FIG. 3 shows a local switching network 300 in block diagram form including three line cards 302-306 coupled to switching fabric 308 via data links 310-318. Although not shown, each line card shown in FIG. 3 includes one or more end device ports embodied and one or more interface and local switches.

In FIG. 3, data links 310-318 are coupled to data ports of entry/exit 320-328 (data ports of entry/exit may be referred to as points of entry/exit, it being understood that data ports and data points are used interchangeably), respectively, of switching fabric 308. Line card 302 is coupled to switching fabric 308 via a pair of data links 310 and 312, line card 304 is coupled to switching fabric 308 via a pair of data links 314 and 316, and Line card 306 is coupled to switching fabric 308 via a single data link 318. Although not shown, each line card 302-306 may be further coupled, directly or indirectly, to one or more end devices such as desktop computers, printers, etc.

Where line cards are connected to a switching fabric via separate data links, certain data transmission requirements must be met. More particularly, a frame in a flow between end devices must be delivered only once to avoid frame replication. Moreover, the frames in a flow between two end devices must be delivered in order. However, where multiple data links exist between the fabric and line cards coupled thereto, one or more of these data transmission requirements may be inadvertently breached.

Figure 4:
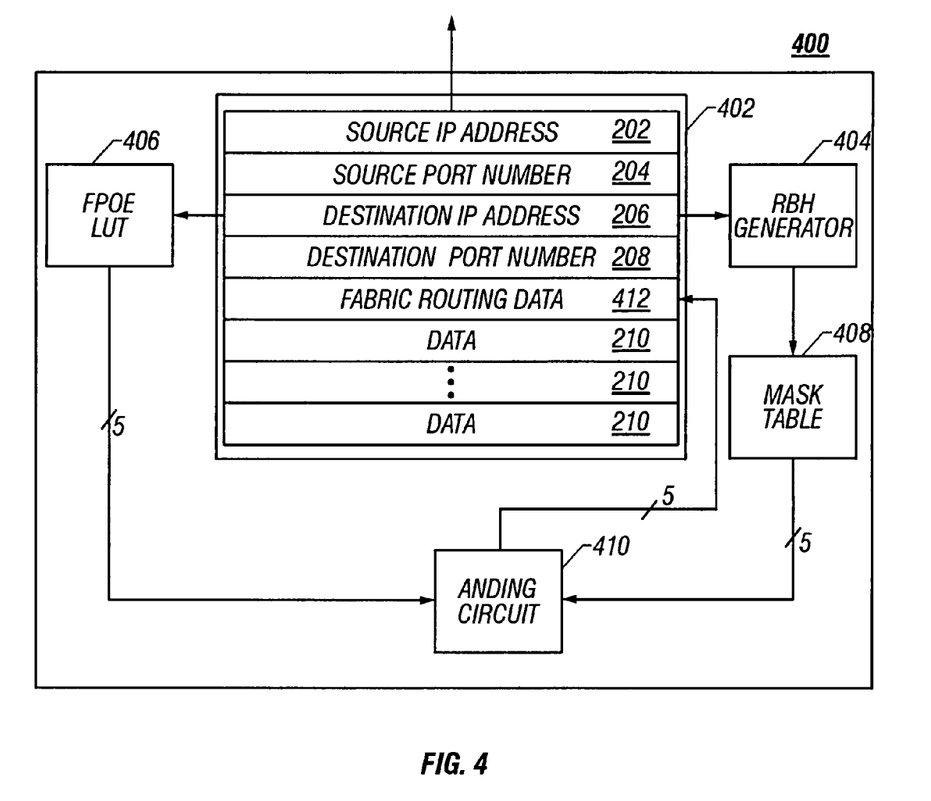
FIG. 4 is a block diagram illustrating a local switch used in one of the line cards of FIG. 3.

FIG. 4 shows one embodiment of at least one interface and local switch (hereinafter referred to as local switch) 400 that may be employed in the line card 302 shown in FIG. 3. It is noted several local switches such as local switch 400 shown in FIG. 4, may be employed in exemplary line card 302, each operating on one or more flow of frames. Further, it is noted that line cards 304 and/or 306 may employ one or more local switches such as local switch 400 shown in FIG. 4.

Local switch 400 includes a frame buffer 402 that receives frames from an source end device coupled to line card 302. Local switch 400 adds fabric routing data to these frames before they are transmitted to a destination end device via fabric 308 and data link 310 or 312. Buffer 402 is shown containing at least one frame having a format similar to that described with reference to FIG. 2. Buffer 402 can store several such frames simultaneously. It is noted that the frame in buffer 402, unlike the frame shown in FIG. 2, includes a field for the storing fabric routing data as will be more fully described below.

Local switch 400 of FIG. 4 also includes a result-bundle-hash (RBH) generator 404, a fabric port of exit/entry (FPOE) lookup table (LUT) 406, mask table 408, and a multibit ANDing circuit 410. RBH generator 404 is coupled to buffer 402 and receives the destination IP address or a port number associated with the destination IP address of a frame contained therein. It is noted that RBH generator 404 may receive additional or alternative information from this frame. Ideally, RBH generator will receive data from the header of the frame which data is constant for all frames in the flow. However, for purposes of explanation, RBH generator 404 will be described as receiving only the destination IP address of the frame, it being understood that the present invention may operate with RBH generator 404 receiving just the port number destination of the frame.

The destination IP address corresponds to an end device where the frame is to be received. The destination IP address may also correspond to two or more end devices coupled to the same or different line cards. RBH generator 404 generates a multi-bit RBH value as function of the destination IP address of the frame. In one embodiment, the RBH generator may take form in a look-up table that stores RBH values. Alternatively, RBH generator may be an embedded processor that generates RBH values as a function of an algorithm to produce the RBH values.

Mask table 408, in the embodiment described with reference to FIGS. 3 and 4, contains two masks. In another embodiment, the mask table may contain more masks. The number of masks in table 408 may equate to the highest number of data links between the switching fabric and a line card coupled thereto. The masks are distinct multi-bit values. The number of bits in each mask typically equates to the number of exit ports from fabric 308 through which a frame may exit. Each mask in table 408 has five bits corresponding, respectively, to the five ports of exit 320-328 through which a frame may exit. In the illustrated embodiment, the least significant bit of each mask table 408 mask corresponds to port of exit 320 in fabric 308, and the most significant bit corresponds to port of exit 328 in fabric 308.

The bits of each mask are set to logical 1 or logical 0. If a line card is coupled to the switching fabric through only one port of exit, the mask bit corresponding to that one fabric port of exit is always set to a logical 1. In the illustrated example, the most significant bit of each mask in table 408 is set to logical 1 since the most significant bit corresponds to port of exit 328, and port of exit 328 is the only port of exit that couples fabric 308 to line card 306. When two bits correspond to distinct ports of exit that couple the switching fabric to a single line card, then in each mask only one of these two bits will be set to logical 1 while the remaining bit is set to logical 0. The particular bit of the two bits that is set to logical 1 will be different in each mask. In the illustrated embodiment, the second and third most significant bits of masks in table 408 correspond to ports of exit 326 and 324, respectively, which couple fabric 308 to line card 304 via data links 316 and 314, respectively, while the first and second least significant bits of the masks correspond to ports of exit 320 and 322, respectively, which couple fabric 308 to line card 302 via data links 310 and 312, respectively. As such, the second and third most significant bits of the first mask in mask table 408 are set to logical 1 and logical 0, respectively, while the second and third most significant bits of the second mask in mask table 408 are set to logical 0 and logical 1, respectively, and the first and second least significant bits of the first mask in mask table 408 are set to logical 1 and logical 0, respectively, while the first and second least significant bits of the second mask in mask table 408 are set to logical 0 and logical 1, respectively.

One of the two masks of table 408 is provided to ANDing circuit 410 in response to the RBH value that is generated or provided by the RBH generator 404. In one embodiment, the mask provided to ANDing circuit 410 depends upon whether the least significant bit of the value generated by RBH generator 404 is a logical 1 or a logical 0. For example, the first of the two masks is provided to ANDing circuit 410 if the least significant bit of the generated RBH value is a logical 0, or a second mask is provided to ANDing circuit 410 if the least significant bit of the generated RBH value is a logical 1. It is noted that the present invention may be implemented without RBH generator 404. In this alternative embodiment, the least significant bit of the destination IP address (or other data in the frame) may be used directly to select one of the masks in table 408.

FPOE LUT 406, like RBH generator 404, receives the destination IP address or, as noted above, a port number associated with the destination IP address of the buffer frame, or other header field data. The present invention will be described with FPOE LUT 406 receiving only the destination IP address. The same destination IP address, accordingly, is provided to both the FPOE LUT 406 and the RBH generator 404. In response to receiving the destination IP address, FPOE LUT 406 outputs a stored FPOE to ANDing circuit 410. As will be noted below, ANDing 410 bit wise ANDs the received FPOE with one of the mask table 408 masks, the result of which is entered as fabric routing data into a field of the frame.

The FPOEs stored in LUT 406 are multi-bit values. The number of bits in each FPOE typically equates to the number of exit ports from fabric 308 through which a frame may exit. Each FPOE in LUT 406 has five bits corresponding, respectively, to the five ports of exit 320-328 through which a frame may exit switching fabric 308. In the illustrated embodiment, the least significant bit of each FPOE stored in LUT 406 corresponds to port of exit 320 in fabric 308, and the most significant bit of each FPOE in LUT 406 corresponds to port of exit 328 in fabric 308.

Each FPOE in LUT 406 corresponds to one or more destination IP addresses (or alternatively, one or more destination port numbers). The bits of each FPOE are set to logical 1 or logical 0. In the illustrated example, bits of an FPOE which are set to logical 1 identify corresponding ports of exit of the fabric through which a frame may emerge to reach the destination IP address of an end device. For example, the two least significant bits of an FPOE may be set to logical 1 to identify exit ports 320 and 322 of fabric 308 through which a frame may exit fabric 308 to reach an end device coupled to line card 302.

ANDing circuit 410, in response to receiving the FPOE and mask, bit wise ANDs the received FPOE and mask to produce the frame routing data mentioned above. The routing data is stored within field 412 of the frame contained within buffer 402. The routing data will be a multi-bit value. After field 412 of the frame is updated with the frame routing data, the updated frame is transmitted to the fabric 308 via data link 310 or 312 depending upon, in one embodiment, the least significant bit of the RBH value produced by RBH generator 404.

The number of bits in the routing data will equate to the number of exit ports of the fabric. One or more bits of the routing data will be set to logical 1. Those bits of the routing data set to logical 1 designate ports of exit from which the frame, once updated, will emerge from the fabric. In the illustrated example, if the most significant bit of the routing data is set to logical 1 while the remaining bits are set to logical 0, then the frame which contains this routing data will emerge from fabric 308 only at port of exit 328. To further illustrate, if the two most significant bits of the routing data are set to logical 1 while the remaining bits are set to logical 0, then the frame which contains this routing data will be duplicated, and a copy of each will emerge from fabric 308 at ports of exit 326 and 328.

Figure 5:
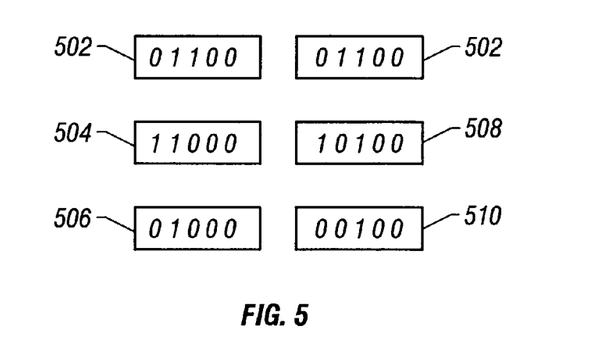
FIG. 5 illustrates operational aspects of the local switch in FIG. 4.

With continuing reference to FIG. 3, FIG. 5 illustrates operational aspects of local switch 400 shown in FIG. 4. More particularly, FIG. 5 illustrates operational aspects of local switch 400 when it receives a first frame of a flow to be transferred to one end device coupled to line card 304. In this illustrated example, the first frame includes a destination IP address that designates the end device coupled to line card 304. FPOE LUT 406, in response to the buffer 402 receiving this frame, outputs FPOE 502 to ANDing circuit 410. The second and third most significant bits of FPOE 502 are set to logical 1 to indicate that the first frame may exit fabric 308 only through ports of exit 324 or 326 (see FIG. 3). RBH generator 404 generates an RBH value. For purposes of explanation, the least significant bit of the generated RBH value will be presumed to be a logical 0. Mask table 408, in response to the generation of the RBH value having a least significant bit equal to logical 0, outputs first mask 504 to ANDing circuit 410. ANDing circuit 506 bit wise ANDs FPOE 502 and first mask 504 to generate fabric routing data 506. The first frame is subsequently updated with routing data 506 and transmitted to fabric 308 via data link 310. Within fabric 308, the updated first frame is routed to only port of exit 326, in accordance with the routing data 506, and subsequently transmitted to line card 304 via data link 316.

FIG. 5 illustrates operational aspects of circuit 400 for transmission of one frame of a flow of frames from card 302 to 304 via fabric 308. Any other frame in the flow would receive the same routing data 506 before being transmitted to fabric 308. In this manner, all frames in the flow are received by line card 304 and subsequently by the end device coupled thereto, in order and without duplication.

Figure 6:
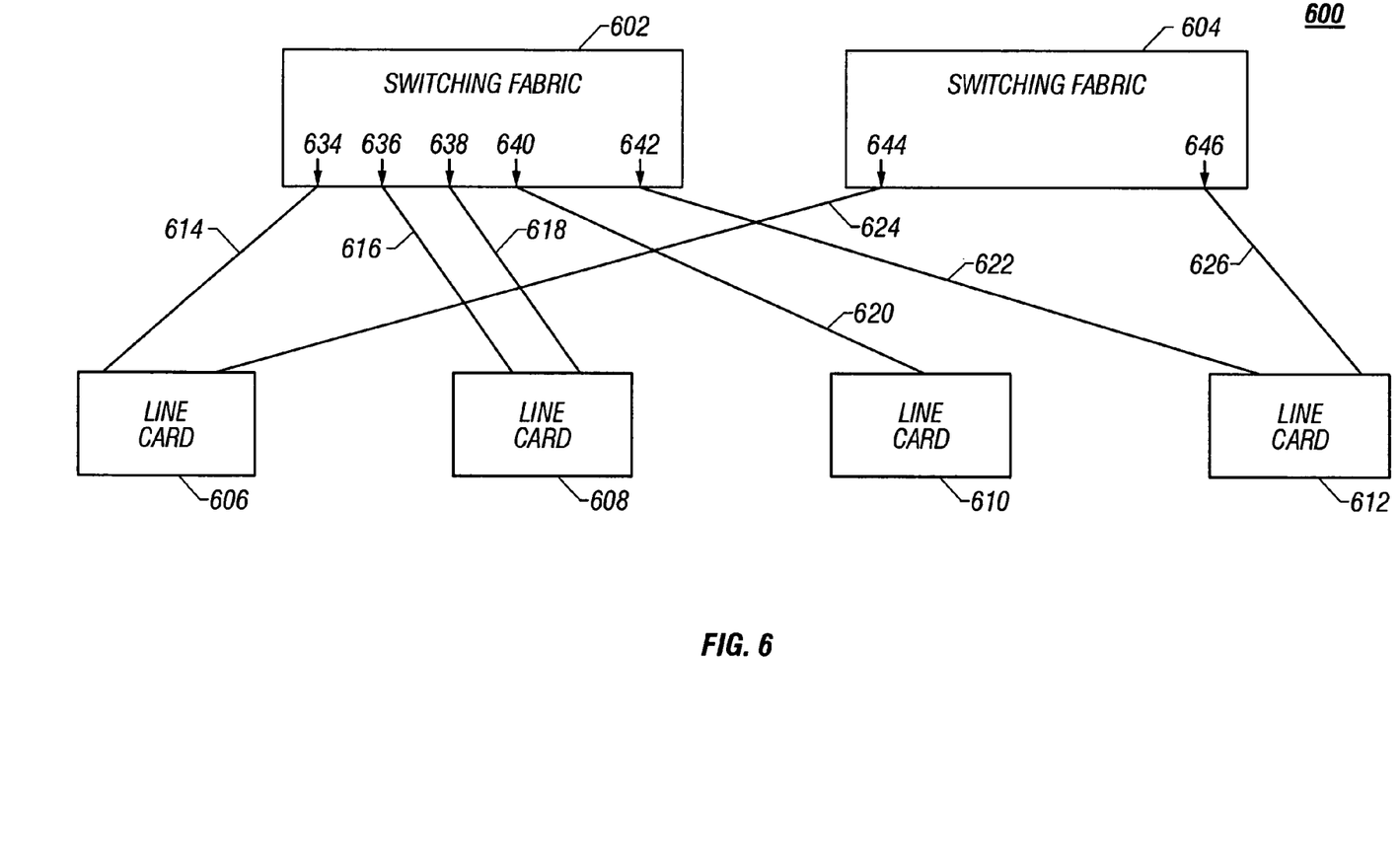
FIG. 6 is a block diagram illustrating a third local switching network.

The description above describes a local switching system having a single fabric connecting several line cards. FIG. 6 illustrates a local switching network 600 containing two switching fabrics 602 and 604. Fabric 602 is coupled to line cards 606-612. Fabric 604 is coupled to line cards 606 and 612. Line cards 606-612 are coupled to fabrics 602 and 604 via data links 614-626. Data links 614, 616, 618, 620, and 622 are coupled to fabric 602 via fabric ports of exit 634, 636, 638, 640, and 642, respectively. Data links 624 and 626 are coupled to fabric 604 via fabric ports of exit 644 and 646, respectively.

The network shown in FIG. 6 is subject to the requirements that frames in a flow must be delivered to its destination in sequential order and without duplication. To maintain flow order, once a flow to a destination line card has begun using one of the two fabrics 602 and 604, all frames in that flow should use the same fabric. It is noted that additional line cards could be added to the destination of a frame flow after the flow has begun which may be unreachable by the switching fabric already in use. In such a case the new destination may use the other fabric but old destinations must continue to receive frames from the fabric used in order to maintain flow order.

Figure 7:
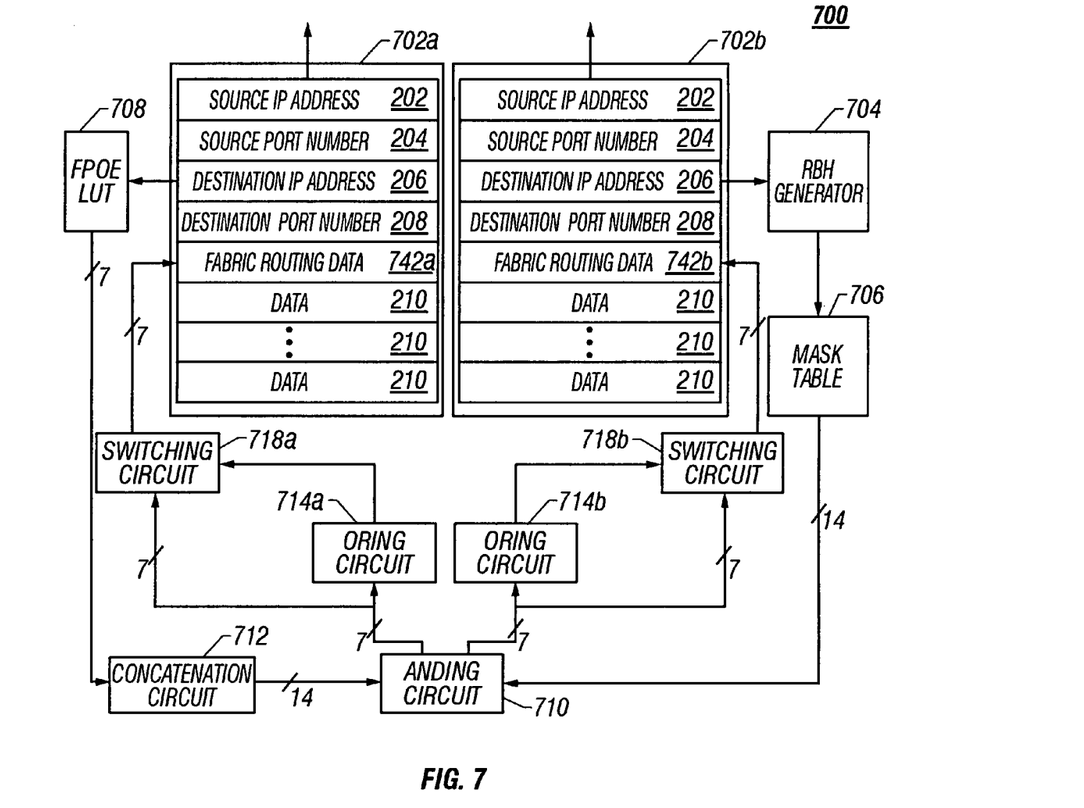
FIG. 7 is a block diagram illustrating a local switch used in one of the line cards of FIG. 6.

FIG. 7 is a block diagram illustrating one embodiment of an interface and local switch (hereinafter referred to as local switch) 700 that may be found within line card 606 of FIG. 6. Local switch 700 may take one of many forms, it being understood that local switch shown in FIG. 7 is but one embodiment. It is noted several local switches such as local switch 700 shown in FIG. 7, may be employed in the exemplary line card. Further, it is noted that any of the other line cards 608-612 may employ one or more local switches such as local switch 700 shown in FIG. 7.

Local switch 700 shown in FIG. 7 includes a pair of frame buffers 702a and 702b, an RBH generator 704, a mask table 706, an FPOE LUT 708, a multibit ANDing circuit 710, a circuit 712 for concatenating FPOEs stored in FPOE LUT 708, ORing circuits 714a and 714b, and switching circuits 718a and 718b for selecting a fabric routing data. It is noted that components 702a-718b of local switch 700 need not be contained on a single card. Rather, some of the components, such as RBH generator 704, may be located remotely on a separate card.

One of the buffers 702a or 702b may receive a frame of a flow from a source end device coupled thereto. The frame may be subsequently copied to the other buffer so that buffers 702a and 702b contain identical frames. Alternatively, the frame may be held in an intake buffer and copied into one or both of buffers 702a and 702b simultaneously. FIG. 7 shows buffers 702a and 702b with the same frame of a flow contained therein. Local switch 700 adds fabric routing data to one or both of the identical frames in buffers 702a and 702b before one or both are transmitted to fabric 602 and/or 604. Local switch adds routing data to only one of the identical frames in buffers 702a and 702b if frame is part of a unicast or multicast flow that transmits through only one of the two fabrics 602 and 604. A unicast flow defines a flow of frames between two end devices. A multicast flow defines frame flow from a single source end device to multiple end devices. The frame that receives the routing data is transmitted to fabric 602 or 604, and the frame in the other buffer may be subsequently removed or deleted. However, if the received and copied frame is part of a multicast flow transmitted through both fabrics 602 and 604, then local switch 700 adds routing data to each frame in buffer 702a and 702b before both frames are transmitted to fabric 602 and 604, respectively. The routing data added to each of the identical frames may be different.

Each frame in buffers 702a or 702b has a format similar to that shown in FIG. 2. Buffers 702a and 702b can store several such frames. It is noted that the frame in buffers 702a or 702b includes a field 742 for storing fabric routing data as will be more fully described below.

With continuing reference to FIGS. 6 and 7, frames may be transmitted from line card 606 to fabric 602 via data link 614, from line card 606 to fabric 604 via data link 624, or from line card 606 to both switching fabrics 602 and 604 via data links 614 and 624, respectively. Both data links 614 and 624 may be used concurrently to transmit frames of one flow or separate flows thereby increasing frame flow out of card 606. Each frame in a unicast flow must transmit to fabric 602 or 604 via data link 614 or 624, respectively.

RBH generator 704 accesses a frame in buffer 702b and receives the destination IP address or a port number associated with the destination IP address of the frame. In response, RBH generator 704 generates an RBH value as a function of the destination IP address or the port number associated with the destination IP address. In one embodiment, the RBH generator 704 may take form in a look-up table that stores RBH values. Alternatively, RBH generator 704 may take form in a processor that generates RBH values as a function of algorithm instructions to produce the RBH values. Given that frames in a flow will have the same destination IP address or port number, the RBH value generated by the RBH generator 704 will be consistent for each frame of that flow.

The least significant bit of the generated RBH value is used to select one of several masks contained in mask table 706. Mask table 706, in the illustrated embodiment, contains first and second masks. In another embodiment, the mask table may contain more masks. The number of masks in table 706 may equate to the highest number of data links between a line card and the switching fabrics coupled thereto. For example, if an extra data link existed between line card 606 and one of the switching fabrics 602 and 604, table 706 would include three distinct masks.

The first and second masks in table 706 are distinct multi-bit values. Each mask contained in table 706 includes a pair of concatenated first and second submasks. The first and submasks are associated with data links 614 and 624, respectively. The number of bits in each submask equates to the number of exit ports in fabrics 602 and 604. In the illustrated embodiment, each submask in table 706 has seven bits corresponding, respectively, to the seven ports of exit 634-646. In the illustrated embodiment, the least significant bit of each submask corresponds to port of exit 634, and the most significant bit corresponds to port of exit 646.

The bits in each submask are set judiciously to ensure that frames in a flow are received by one or more destination end devices in order and without replication. As noted above, the first and second submasks correspond to data links 614 and 624, respectively, which in turn are coupled to fabrics 602 and 604, respectively, via ports of exit 634 and 644, respectively. The bits of each mask are set to logical 1 or logical 0. It is again noted that each submask corresponds to a respective switching fabric. For illustrative purposes, each mask includes first and second submasks concatenated together. In the illustrated example, each first submask corresponds to switching fabric 602 while each second submask corresponds to switching fabric 604. A line card may be coupled to one or both of the switching fabrics.

When a line card is coupled to only one fabric via a single port of exit, then the bits corresponding to the single port of exit will be set to logical 1 in each of the submasks corresponding to the one fabric, while the bits corresponding to the single port of exit will be set to logical 0 in each of the other submasks. In the illustrated example, line card 610 is coupled to only fabric 602 via port of exit 640. As such, the bits corresponding to port of exit 640 in each of the first submasks is set to logical 1, while the bits corresponding to port of exit 640 in each of the second submasks is set to logical 0.

When a line card is coupled to only one fabric via two ports of exit, then only one of the two bits corresponding respectively to the two ports of exit will be set to logical 1 in each of the submasks corresponding to the one fabric, while the two bits corresponding to the two ports of exit will be set to logical 0 in each of the other submasks. Further, the particular bit of the two bits that is set to logical 1 will be different in each of the submasks. In the illustrated embodiment, line card 608 is coupled to fabric 602 via ports of exit 636 and 638. As such, only one of the two bits corresponding to ports of exit 636 and 638 will be set logical 1 in each of the first submasks, while the two bits corresponding to ports of exit 636 and 638 will be set to logical 0 in each of the second submasks. Further, the particular bit set to logical 1 will be different in each of the first submasks. For example, the bits corresponding to ports of exit 636 and 638 will be set to logical 1 and logical 0, respectively, in one of the first submasks, while the bits corresponding to ports of exit 636 and 638 will be set to logical 0 and logical 1, respectively, in the other first submask.

When one line card is coupled to two fabrics via separate ports of exit, then one of the two bits corresponding respectively to the separate ports of exit will be set to logical 1 in the first submask of the first mask while the two bits corresponding respectively to the separate ports of exit will be set to logical 0 in the second submask of the first mask, and one of the two bits corresponding respectively to the separate ports of exit will be set to logical 1 in the second submask of the second mask while the two bits corresponding respectively to the separate ports of exit will be set to logical 0 in the first submask of the second mask. Further, the particular bit of the two bits that is set to logical 1 in the first submask of the first mask will be different than the particular bit of the two bits that is set to logical 1 in the second submask of the second mask. In the illustrated embodiment, line card 612 is coupled to both fabrics 602 and 604 via ports of exit 642 and 646, respectively. As such, one of the two bits corresponding to ports of exit 642 and 646, respectively, will be set to logical 1 in the first submask of the first mask while the two bits corresponding to ports of exit 642 and 646, respectively, will be set to logical 0 in the second submask of the first mask, and one of the two bits corresponding to ports of exit 642 and 646, respectively, will be set to logical 1 in the second submask of the second mask while the two bits corresponding to ports of exit6 642 and 646, respectively, will be set to logical 0 in the first submask of the second mask. Additionally in the illustrated embodiment, the bits corresponding to ports of exit 642 and 646 will be set to logical 0 and logical 1, respectively, in first submask of the first mask, while the bits corresponding to ports of exit 642 and 646 will be set to logical 1 and logical 0, respectively, in the second submask of the second mask.

One of the two masks of table 706 is provided to ANDing circuit 710 in response to the RBH value that is generated or provided by the RBH generator 704. In one embodiment, the mask provided to ANDing circuit 710 depends upon whether the least significant bit of the value generated by RBH generator 704 is a logical 1 or a logical 0. For example, the first mask in table 706 is provided to ANDing circuit 710 if the least significant bit of the generated RBH value is a logical 0, or the second mask is provided to ANDing circuit 710 if the least significant bit of the generated RBH value is a logical 1. The choice of masks used is made randomly, as noted above, using the least significant bit of the value generated by the RBH generator 704 so that half of all flows employ one of the two masks. Another bit of the value generated by RBH generator may be used. However, it is again noted that a given flow, whether unicast or multicast, will result in the use of the same mask. It is noted that the present invention may be implemented without RBH generator 704. In an alternative embodiment, the least significant bit of the destination IP address (or other data in the frame) may be used directly to select one of the masks in table 706.

The destination IP address or the port number associated with the destination IP address of the packet in buffer 702 may be used to select an FPOE from LUT 708. FPOE LUT 708 outputs an FPOE to circuit 712 corresponding to the destination IP address or the port number associated with the destination IP address of the packet in buffer 702. The FPOEs stored in LUT 708 are multi-bit values. The number of bits in each FPOE typically equates to the number of exit ports from fabrics 602 and 604 through which a frame may exit. Each FPOE in LUT 708 has seven bits corresponding, respectively, to the seven ports of exit 634-646 through which a frame may exit switching fabric 602 or 604. In the illustrated embodiment, the least significant bit of each FPOE stored in LUT 708 corresponds to port of exit 634 in fabric 602, and the most significant bit of each FPOE in LUT 708 corresponds to port of exit 646 in fabric 604.

Each FPOE in LUT 708 corresponds to one or more destination IP addresses (or alternatively, one or more destination port numbers). The bits of each FPOE are judiciously set to logical 1 or logical 0. For example, bits of an FPOE which are set to logical 1 identify corresponding ports of exit of the fabrics through which a frame may emerge to reach a destination IP address of an end device.

As noted above, circuit 712 receives and concatenates the FPOE output of LUT 708 with itself. This concatenated value is provided to ANDing circuit 710. ANDing circuit 710 bit wise ANDs the concatenated FPOE with the mask output from mask table 706. The upper and lower halves of the result from ANDing circuit 710 is provided to ORing circuits 714a and 714b, respectively. ORing circuit 714a bit wise ORs the upper half of the result from ANDing circuit 710, while ORing circuit 714b bit wise ORs the lower half of the result from ANDing circuit 710. Further, the upper and lower halves of the result from ANDing circuit 710 are provided to switching circuits 718a and 718b, respectively. The results of ORing circuits 714a and 714b are likewise provided to switching circuits 718a and 718b, respectively. Switching circuit 718a, in turn, transmits and stores the upper half of the ANDing circuit result into field 742a as routing if the ORing result of ORing circuit 714a is a logical 1. Likewise, switching circuit 718b transmits and stores the lower half of the ANDing circuit result into field 742b as routing data if the ORing result of ORing circuit 714b is a logical 1. Once updated with the routing data, the frame in one or both buffers are transmitted. Again, if the outputs of ORing circuits 714a and 714b are both logical 1, then the frames in both buffers 702a and 702b are updated with routing data and subsequently transmitted to fabrics 602 and 604, respectively, in multicast fashion. If only the output of ORing circuit 714a is a logical 1, then only the frame in buffer 702a is updated with routing data and subsequently transmitted to fabric 602. Likewise, if only the output of ORing circuit 714b is a logical 1, then only the frame in buffer 702b is updated with routing data and subsequently transmitted to fabric 604. Once transmitted to fabric 602 or 604, the frame or frames are routed to one or more ports of exit in fabric 602 or 604 in accordance with the bit values of the frame routing data.

Figure 8:
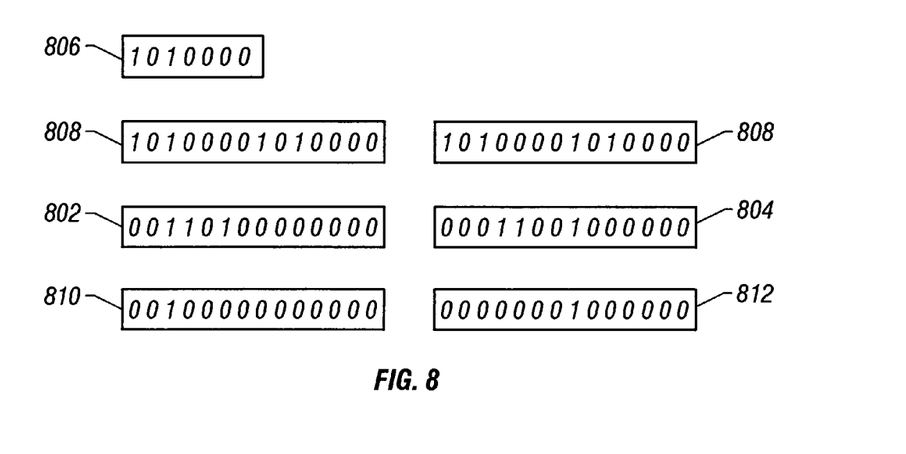
FIG. 8 illustrates operational aspects of the local switch in FIG. 7.

FIG. 8 represents operational aspects of a frame flow from an end device coupled to card 606 to an end device coupled to card 612. Note in FIG. 6 that card 606 is coupled to fabrics 602 and 604 via data links 614 and 624, respectively, and line card 612 is coupled to fabrics 602 and 604 via data links 622 and 626, respectively. Frames transmitted between line cards 606 and 612 via fabric 602 must transmit via data links 614 and 622, and frames transmitted between line cards 606 and 612 via fabric 604 must transmit via data links 624 and 626.

RBH generator 704 generates an RBH value in response to the destination IP address or the port number associated with the destination IP address contained within a frame stored in buffer 702. Mask table 706 outputs either mask 802 or 804 depending upon the least significant bit of the RBH value outputted by RBH generator 704 is logical 1 or logical 0. FPOE LUT 702 outputs FPOE 806 using the same destination IP address or port number associated with the destination IP provided to RBH generator 704. FPOE 806 is concatenated with itself by circuit 712, the result 808 of which is provided to ANDing circuit 710. Mask 802 or 804 is likewise provided to ANDing circuit 710. ANDing circuit 710 bitwise ANDs mask 802 or 804 with the concatenated result 808. The upper half of result 810 or 812 of this operation is provided to ORing circuit 714a and switching circuit 718a, while the lower half of result 810 or 812 is provided to ORing circuit 714b and switching circuit 718b. ORing circuits 714a and 714b bit wise OR the upper and lower halves, respectively, of ANDing circuit result 810 or 812. The results of ORing circuits 714a and 714b are provided to switching circuits 718a and 718b, respectively, which, in turn, transmit either the upper half, the lower half, or both halves of result 810 or 812 into the frames of buffers 702a or 702b as described above. If, ORing circuit 714a generates a logical 1 from ORing the upper half of result 810 or 812, then, the upper half of result 810 or 812 is stored in field 742a as fabric routing data, and the frame in buffer 702a is transmitted to fabric 602. If ORing circuit 714b generates a logical 1 from ORing the lower half of result 810 or 812, then, the lower half of result 810 or 812 is stored in field 742b as fabric routing data, and the frame in buffer 702b is transmitted to fabric 604.

The number of bits in the routing data in this preferred embodiment will equate to the number of exit ports of the fabrics. One or more bits of the routing data will be set to logical 1. Those bits of the routing data set to logical 1 designate ports of exit from which the frame, once updated, will emerge from the fabrics. In the illustrated example, if the most significant bit of the routing data is set to logical 1 while the remaining bits are set to logical 0, then the frame which contains this routing data will emerge from fabric 604 only at port of exit 646.

It is noted that a given unicast flow through one of the fabrics 602 or 604 may be transformed into a multicast flow, or a multicast flow through two points of exit may be transformed to a multicast flow through three or more points of exit. Transforming a given unicast flow to a multicast flow can be achieved by altering the bits of the FPOE stored in LUT 708 which corresponds to the unicast flow. For example, one of the logical 0 bits of an FPOE could be changed to a logical 1 to indicate that the unicast flow should be changed to a multicast flow and exit a switching fabric through an additional point of exit. This modification can occur during the unicast flow. This modification could be initiated externally to the local switch 700 by, for example, a router.

Although the present invention have been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. A method comprising:
   a memory circuit receiving a first data frame of a first stream of data frames to be transmitted to a first destination device via a switching fabric and a line card, wherein the switching fabric comprises first and second data ports through which data frames can exit the switching fabric to reach the first destination device via the line card, wherein the first and second data ports are coupled to the line card via first and second communication links, respectively;
   generating and adding first routing data to the first data frame, wherein the first routing data identifies the first data port through which data frames can exit the switching fabric to reach the first destination device via the line card;
   transmitting the received first data frame to the switching fabric after the first routing data is added to the first data frame;
   the memory circuit receiving a second data frame of a second stream of data frames to be transmitted to a second destination device via the switching fabric and the line card;
   generating and adding second routing data to the second data frame, wherein the second routing data identifies the second data port through which data frames can exit the switching fabric to reach the second destination device via the line card;
   transmitting the received second data frame to the switching fabric after the second routing data is added to the second data frame.

2. The method of claim 1 wherein the memory circuit is coupled to the switching fabric via a first pair of data ports.

3. The method of claim 2 wherein the first data frame is transmitted to the switching fabric via one of the first pair of data ports.

4. The method of claim 1 wherein the first data frame is transmitted to the first destination device via the first data port and wherein the second data frame is transmitted to the second destination device via the second data port.

5. The method of claim 1 wherein the first routing data comprises a first multi-bit value, wherein each bit of the first multi-bit value is set to logical 1 or logical 0, wherein each bit of the first multi-bit value corresponds to one of a plurality of data ports through which data frames can exit the switching fabric, wherein the bit of the first multi-bit value corresponding to the first data port is set to indicate that the first data frame is to exit the switching fabric though the first data port.

6. The method of claim 5 wherein the second routing data comprise a second multi-bit value, wherein each bit of the second multi-bit value is set to logical 1 or logical 0, wherein each bit of the second multi-bit value corresponds to one of the plurality of data ports through which data frames can exit the switching fabric, wherein the bit of the second multi-bit value corresponding to the second data port is set to indicate that the second data frame is to exit the switching fabric though the second data port.

7. The method of claim 5 wherein another bit of the first multi-bit value corresponding to another of the plurality of data ports, is set to indicate the first data frame or a copy thereof is to exit the switching fabric through the other of the plurality of data ports.

8. A system comprising:
   first and second line cards coupled to a switching fabric;
   first and second communication links;
   wherein the first line card comprises a memory circuit for receiving first and second data frames of first and second data frame streams, respectively, to be transmitted to first and second destination devices, respectively, via the switching fabric and the second line card;
   wherein the switching fabric comprises first and second data ports coupled to the second line card via the first and second communication links, respectively, through which data frames can exit the switching fabric to reach the first and second destination devices via the second line card;
   wherein the first line card further comprises a first circuit for generating and adding first and second routing data to the first and second data frames, respectively, wherein the first routing data identifies the first data port through which data frames can exit the switching fabric to reach the first destination device via the second line card, wherein the second routing data identifies the second data port through which data frames can exit the switching fabric to reach the second destination device via the second line card.

9. The system of claim 8 wherein the memory circuit is coupled to the switching fabric via a first pair of data ports of the switching fabric.

10. The system of claim 9 wherein the first line card comprises a second circuit for transmitting the first data frame to the switching fabric via one of the first pair of data ports.

11. The system of claim 8 wherein the switching fabric is configured to forward the first data frame to the first destination device via the first data port after the first routing data is added to the first data frame, and wherein the switching fabric is configured to forward the second data frame to the second destination device via the second data port after the second routing data is added to the second data frame.

12. The system of claim 8 wherein the first routing data comprise a first multi-bit value, wherein each bit of the first multi-bit value is set to logical 1 or logical 0, wherein each bit of the first multi-bit value corresponds to one of a plurality of data ports through which data frames can exit the switching fabric, wherein the bit of the first multi-bit value corresponding to the first data port is set to indicate that the first data frame is to exit the switching fabric though the first data port.

13. The system of claim 12 wherein the second routing data comprise a second multi-bit value, wherein each bit of the second multi-bit value is set to logical 1 or logical 0, wherein each bit of the second multi-bit value corresponds to one of the plurality of data ports through which data frames may exit the switching fabric, wherein the bit of the second multi-bit value corresponding to the second data port is set to indicate that the second data frame is to exit the switching fabric though the second data port.

14. An apparatus comprising:
   a first means for receiving first and second data frames of first and second data frame streams, respectively, to be transmitted to first and second destination devices, respectively, via a switching fabric and a line card;
   wherein the switching fabric comprises first and second data ports through which data frames can exit the switching fabric to reach the first and second destination devices via the second line card, wherein the first and second data ports are coupled to the second line card via first and second communication links, respectively;
   a second means for generating and adding first and second routing data to the first and second data frames, respectively, wherein the first routing data identifies the first data port of the switching fabric through which data frames can exit the switching fabric to reach the first destination device via the second line card, wherein the second routing data identifies the second data port of the switching fabric through which data frames can exit the switching fabric to reach the second destination device via the second line card.

15. The apparatus of claim 14 wherein the first means is coupled to the switching fabric via a first pair of data ports.

16. The apparatus of claim 15 a third means for transmitting the first data frame to the switching fabric via one of the first pair of the plurality of data ports.

17. The apparatus of claim 14 wherein the switching fabric is configured to forward the first data frame to the first destination device via the first data port after the first routing data is added to the first data frame, and wherein the switching fabric is configured to forward the second data frame to the second destination device via the second data port after the second routing data is added to the second data frame.

18. The apparatus of claim 14 wherein the first routing data comprise a first multi-bit value, wherein each bit of the first multi-bit value is set to logical 1 or logical 0, wherein each bit of the first multi-bit value corresponds to one of a plurality data ports through which data frames may exit the switching fabric, wherein the bit of the first multi-bit value corresponding to the first data port is set to indicate that the first data frame is to exit the switching fabric though the first data port.

19. The apparatus of claim 18 wherein the second routing data comprise a second multi-bit value, wherein each bit of the second multi-bit value is set to logical 1 or logical 0, wherein each bit of the second multi-bit value corresponds to one of the plurality of data ports through which data frames may exit the switching fabric, wherein the bit of the second multi-bit value corresponding to the second data port is set to indicate that the second data frame is to exit the switching fabric though the second data port.

* * * * *